United States Patent [19]

Kubo et al.

[11] Patent Number: 4,500,959
[45] Date of Patent: Feb. 19, 1985

[54] APPARATUS FOR INVALIDATING THE CONTENT OF AN INSTRUCTION BUFFER BY PROGRAM STORE COMPARE CHECK

[75] Inventors: Kanji Kubo; Tsugio Momose; Chikahiko Izumi, all of Hadano, Japan

[73] Assignee: Hitachi, Ltd., Tokyo, Japan

[21] Appl. No.: 375,587

[22] Filed: May 6, 1982

[30] Foreign Application Priority Data

May 11, 1981 [JP] Japan .................................. 56-69458

[51] Int. Cl.³ .............................................. G06F 9/30
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 4,040,030 | 8/1977 | Cassonnet | 364/200 |
| 4,042,912 | 8/1977 | Bachman et al. | 364/200 |
| 4,044,334 | 8/1977 | Bachman et al. | 364/200 |
| 4,050,058 | 9/1977 | Garlic | 364/200 |
| 4,179,737 | 12/1979 | Kim | 364/200 |
| 4,245,302 | 1/1981 | Amdahl | 364/200 |
| 4,298,927 | 11/1981 | Berglund et al. | 364/200 |
| 4,371,924 | 2/1983 | Schaefer et al. | 364/200 |

*Primary Examiner*—Jerry Smith
*Assistant Examiner*—Gary V. Harkcom
*Attorney, Agent, or Firm*—Antonelli, Terry & Wands

[57] ABSTRACT

In a data processing system having an instruction buffer, inconsistency between an instruction stored in a main memory and the same instruction present in the instruction buffer occurs at the time of a store operation to the memory if the instruction supplied to the store area of the main memory previously has been prefetched to and is present in the instruction buffer. The changing in the memory of the content of the instruction prefetched to the instruction buffer and the fact that the changed instruction is about to be executed are detected on the basis of the instruction fetch address of an instruction to be fetched from the memory to the instruction buffer, the instruction address of the next instruction to be executed, information concerning the byte position at which the instruction to be executed is stored, the store address at which the changed instruction is stored in the main storage and information concerning the byte position in the main storage of the instruction which is changed by the store operation. When the execution of the instructions proceeds to the changed instruction, the content of the instruction buffer is invalidated.

12 Claims, 15 Drawing Figures

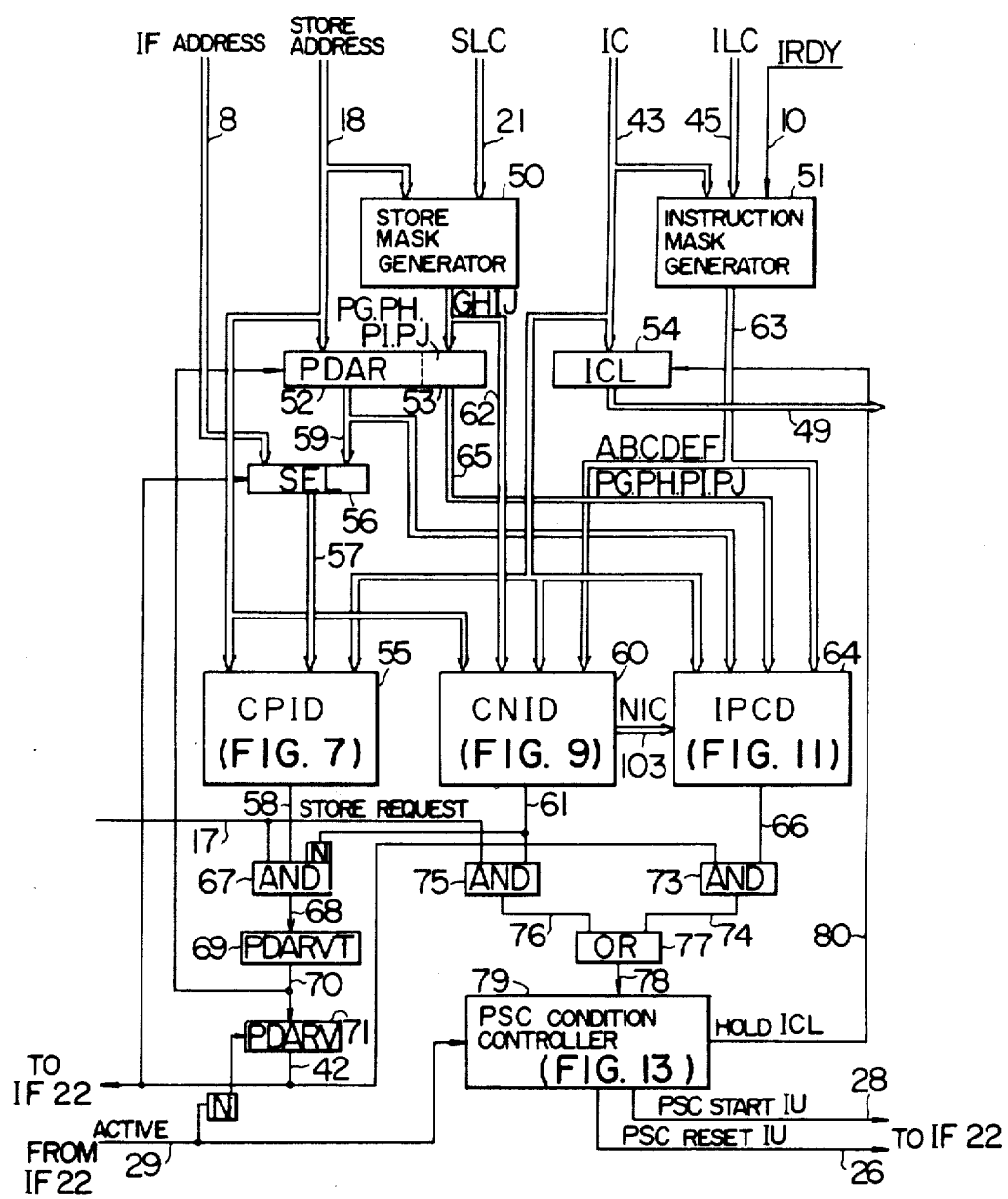

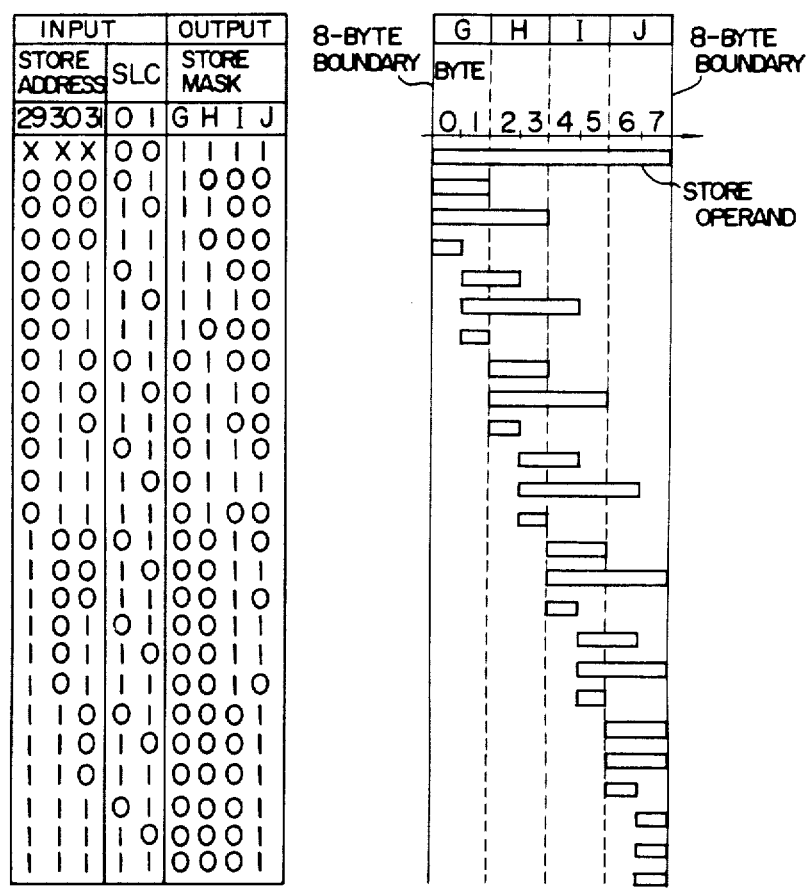

APPARATUS FOR INVALIDATING THE CONTENT OF AN INSTRUCTION BUFFER BY PROGRAM STORE COMPARE CHECK

BACKGROUND OF THE INVENTION

The present invention relates to an advanced control data processing system.

In the advanced control data processing system, an instruction currently executed as well as a certain number of sequence instructions are prefetched from a main storage and buffered in a high speed storage called an instruction buffer, and when the current instruction has been executed the next instruction is read from the instruction buffer for execution. In this manner, the overhead involved in the instruction fetch operation which occurs between instruction executions is reduced.

Since the fetch of instructions from the memory (main storage) to the instruction buffer is usually effected in accordance with the data depth of the memory, that is, eight bytes at a time, data as an operand can be read out as well as the instruction. As the capacity of the instruction buffer increases, the tendency of fetching the data as the operand to the instruction buffer increases. Under such a circumstance, an inconsistency will occur between the memory and the instruction buffer if a preceding instruction calls for a memory store operation to change an instruction or data in the memory, which instruction or data has already been fetched to the instruction buffer.

Such an inconsistency between the memory and the instruction buffer can be resolved by invalidating the entire content of the instruction buffer when the content fetched to the instruction buffer is changed in the memory and fetching instructions (which may include data depending on the data depth of the memory and the capacity of the instruction buffer) included between the address of the currently executed instruction and the address of the changed instruction or data.

However, if a branch instruction is included preceding the changed instruction or data and the branch by that branch instruction succeeds, or if the data, not the instruction, is changed (the data fetched to the instruction is neglected because it is not an instruction), the changed content may not be validly executed as an instruction. In such a case, it is not desirable from a standpoint of efficiency of instruction execution to invalidate the entire content of the instruction buffer including valid instructions and refetch the instructions or data from the memory.

Japanese Patent Application Laid-Open No. 54-82140 (Japanese Patent Publication No. 56-40378) of the present assignee discloses means for preventing the decrease of the efficiency of the instruction execution due to the invalidation of the instruction buffer by suppressing further prefetch if the content prefetched to the instruction buffer is changed in the memory by the memory store operation and invalidating the content of the instruction buffer when the instruction execution proceeds to the changed instruction. In order to detect that the instruction execution has proceeded to the changed instruction, the address for the store operation and the address of the instruction to be executed are compared, and when they are equal it is determined that the instruction execution has proceeded to the changed instruction. However, since the comparison is made only by addresses and hence a minimum unit of the comparison is the data depth (e.g. eight bytes) of the data from the memory, the instruction buffer will be invalidated only if the compare equality is detected for the eight-byte blocks even if the byte position for the store operation and the byte position of the instruction to be executed are not equal. Thus, there still remains a possibility that the instruction buffer is invalidated when the changed content is not validly executed as an instruction.

SUMMARY OF THE INVENTION

It is an object of the present invention to provide an advanced control data processing system having an improved efficiency of instruction execution.

It is another object of the present invention to provide a data processing system which reduces unnecessary invalidation of an instruction buffer.

The present data processing system operates to detect that fort that the content prefetched to the instruction buffer has been changed in the memory and that the instruction execution has proceeded to a point where the changed instruction is to be executed next, based on the read address of the instruction next to be fetched from the memory to the instruction buffer, the execution instruction address of the instruction to be executed next, information as to the byte position at which the instruction to be executed next is stored, the store address of a store instruction and information as to the byte position of the information changed by the store operation.

In accordance with the present invention, when the content prefetched to the instruction buffer is changed in the memory, the instruction buffer is invalidated only when the changed content is actually executed as the instruction. Thus, unnecessary invalidation of the instruction buffer and unnecessary fetch from the memory are reduced and the efficiency of the instruction execution is improved.

BRIEF DESCRIPTION OF THE DRAWINGS

The present invention will be apparent from the following detailed description taken in conjunction with the accompanying drawings, in which:

FIG. 4 shows a block diagram of a program store compare (PSC) controller shown in FIG. 2;

FIGS. 5(a) and (b) illustrate an operation of a store mask generator shown in FIG. 4;

DESCRIPTION OF THE PREFERRED EMBODIMENT

Figure 1:
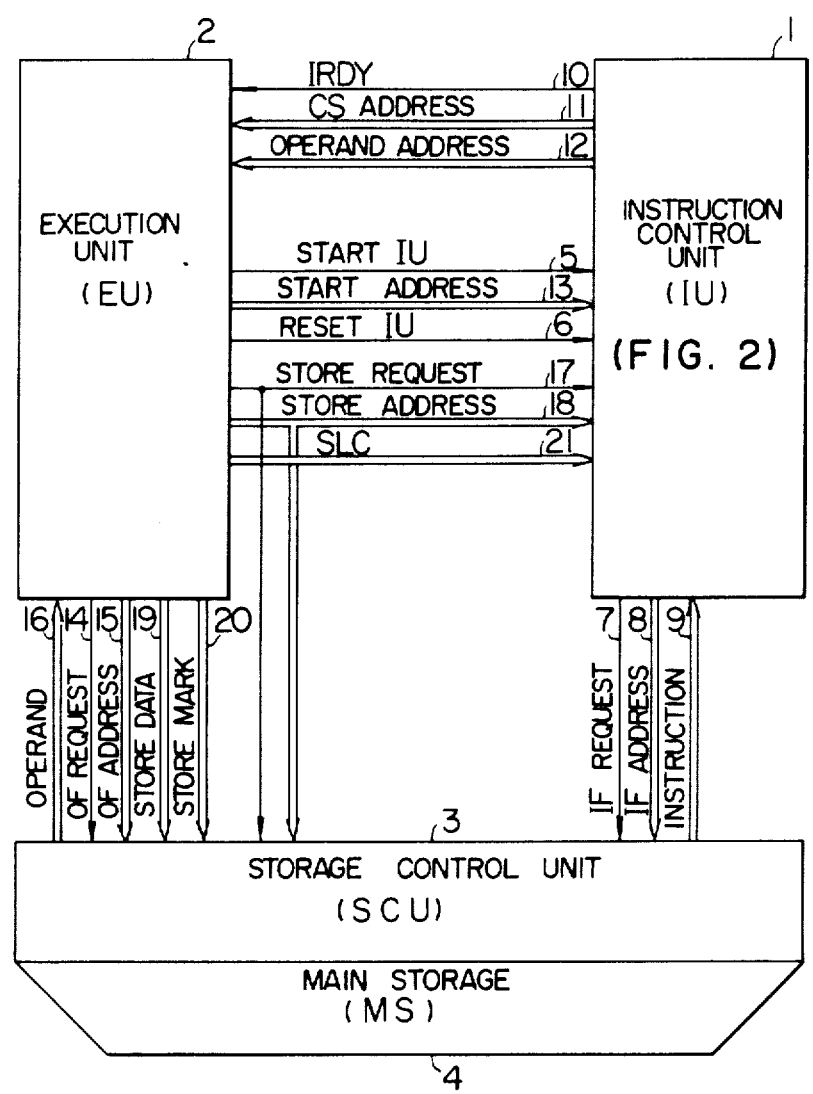
FIG. 1 shows a block diagram of one embodiment of the present invention.

FIG. 1 shows a block diagram of an advanced control data processing unit which illustrates interface signals between an instruction unit (IU) 1, an execution unit (EU) 2, a storage control unit (SCU) 3 and main storage (MS) 4 together with the directions of the signal flows. Those interface signals which are not directly related to the present invention are omitted in FIG. 1.

Referring to FIG. 1, control paths 5 and 6 from the EU 2 to the IU 1 instruct a start (start IU) and a reset (reset IU) of the IU 1, respectively. When the start IU is ON, it starts an instruction fetch control of the IU 1 to start the instruction fetch. The first instruction fetch address is determined by a start address 13. When an instruction fetch request (IF request) 7 and an instruction fetch address (IF address) 8 are sent from the IU 1 to the SCU 3, the SCU 3 and the MS 4 are started so that instruction data 9 in the MS 4 specified by the IF address 18 is fetched to the IU 1. This instruction data is temporarily stored in an instruction buffer (described in detail hereinafter) where it is divided into individual instructions, which are then sequentially decoded. The decoded instruction starts the EU 2 for the execution. A start control signal for the EU 2 by the IU 1 is an instruction read (IRDY) signal 10 is accompanied by an address (CS address) 11 of a control storage (CS), so that a first microprogram for controlling the execution of the instruction is read out from the CS. For an operand processing instruction, the IRDY 10 is further accompanied by an operand address 12 determined by an operand calculation. When the instruction to be executed in the EU 2 is a fetch instruction, that is, when it rolls for fetching the operand from the MS 4, processing it and storing a result in a register, the EU 2 sends to the SCU 3 an operand fetch request (OF request) 14 and an operand fetch address (OF address) 15 for specifying the operand address in the MS 4. When started by the OF request 14, the SCU 3 fetches the operand from the address of the MS 4 specified by the OF address 15 and transfers it to the EU 2 through an operand path 16. When the instruction to be executed by the EU 2 is a store instruction which calls for reading out the operand from a register or the MS 4 and storing (write) the result in the MS 4, the operand is first read from the register or fetched from the MS 4 and processed to prepare store data. Then, the EU 2 sends to the SCU 3 a store request 17, a store address 18, store data 19 and a store mark 20 for specifying the byte position of the eight bytes in which the store data is to be stored. The SCU 3 starts the operation in response to the store request 17 to write the store data 19 at the byte position of the MS 4 specified by the store address 18 and the store mark 20. Of the store information sent from the EU 2 to the SCU 3, the store request 17 and the store address 18 are also sent to the IU 1 to check to see if the IU 1 has changed the instruction prefetched to the instruction buffer by the store operation. This check is called a program store compare (PSC). For the PSC check, the EU 2 encodes the information of the store mark 20 to prepare a store length code (SLC), which is sent to the IU 1.

Figure 2:
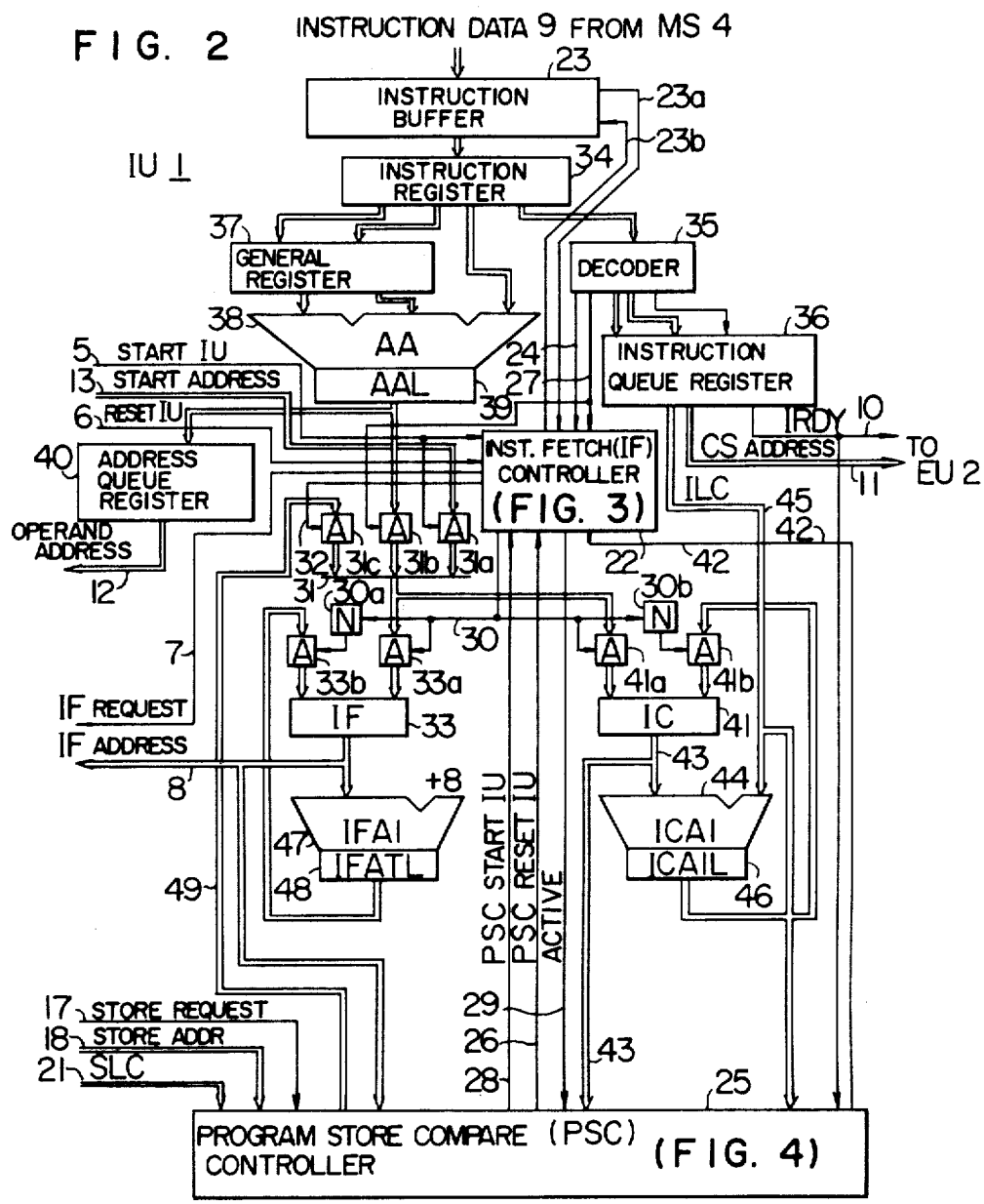
FIG. 2 shows a block diagram of an instruction control unit shown in FIG. 1.

FIG. 2 shows the details of the IU 1. The start IU on path 5 and the reset IU on path 6 from the EU 2 for starting and resetting the IU 1 are supplied to an instruction fetch (IF) controller 22. The instruction data fetched from the MS 4 is stored in the instruction buffer 23. The instruction chain in the instruction buffer 23 is sequentially read into an instruction register 34 and decoded by a decoder 35. If the instruction is a branch instruction, a reset signal (reset IF) 24 resulting from the decoding of the branch instruction and a start signal (start IF) 27 resulting from the decoding of the branch instruction are supplied to the IF controller 22. If a vacant area corresponding to the memory data depth (e.g. eight bytes) is present in the instruction buffer 23, it sends a signal 23a indicative of instruction buffer vacancy to the IF controller 22. A PCS reset IU 26 and a PCS start IU 28 are also supplied from the PSC controller 25 to the IF controller 22. The PCS reset IC and the PCS start IC 28 will be described in detail hereinlater. When the PSC occurs, that is, when the changed content is to be executed as an instruction, the PSC reset IU 26 is turned ON, and subsequently the PSC reset IU 26 is turned OFF and the PCS start IU 28 is turned ON.

Figure 3:
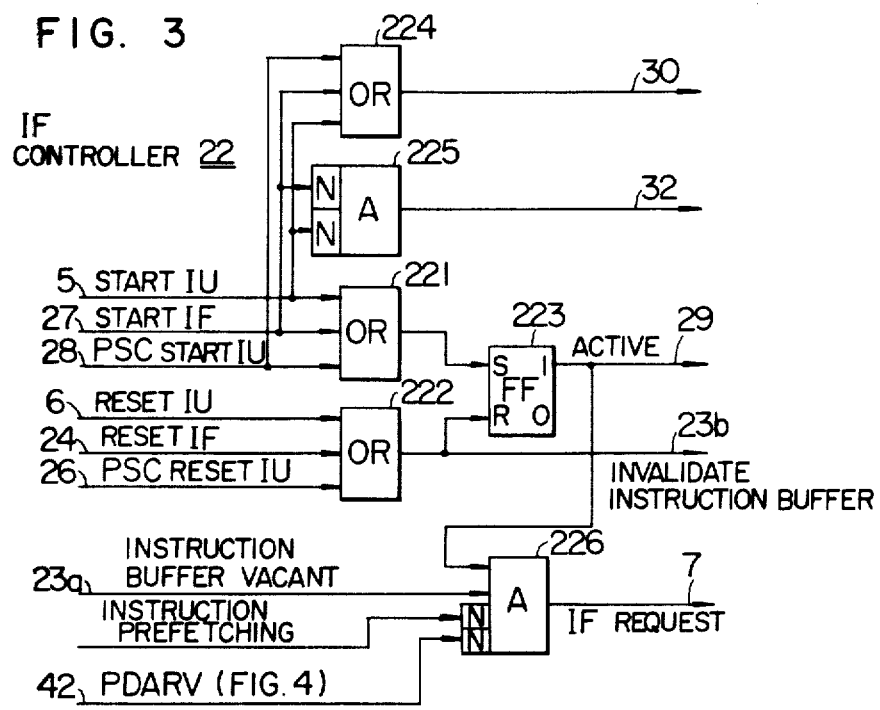
FIG. 3 shows a block diagram of an instruction fetch controller shown in FIG. 2.

FIG. 3 shows a detail of the IF controller 22. The IF controller 22 is started by the start IU 5 from the EU 2, the start IF 27 by the decoding of the branch instruction or the PSC start IU 28 from the PSC controller 25, any of which will set a flip-flop (FF) 223 through an OR gate 221. It is reset by the reset IU 6 from the EU 2, the reset IF 24 by the decoding of the branch instruction or the PSC reset IU 26 from the PSC controller 25 through an OR gate 222. The output of the OR gate 222 is also supplied to the instruction buffer 23 on line 23b to invalidate the instruction buffer 23. The reset and start requests to the IU 1 by the EU 2 are issued when, for example, an interrupt request is issued and the instruction address executed by the IU 1 is to be changed (that is, from a normal program to an interrupt processing program). The reset and start request to the IF controller 22 by the branch instruction are issued when, for example, because of the branch by the branch instruction to another program, the execution of the current instruction chain is stopped and the execution of the branch-to instruction chain is started. The reset and start requests to the IF controller 22 by the PSC controller 25 are issued when, for the execution of a changed instruction as the current instruction, the execution of the current instruction is stopped to fetch the changed instruction from the MS 4 and the execution of the changed instruction is started. When the IF controller 22 is reset, a signal ACTIVE 29 which indicates the status of the IF controller 22 is turned OFF, and when the IF controller 22 is started, the ACTIVE 29 is turned ON. The on-state ACTIVE 29 is supplied to the PSC controller 25 to indicate that the instruction fetching is valid. In FIG. 3, the ACTIVE 29 is supplied to an AND gate 226, to which are applied the instruction buffer vacant signal 23a, a signal indicating that the instruction fetch is in progress through an inverter N, and an output 42 of a control flip-flop PDARV 71 (FIG. 4) through an inverter N. The PDARV 71, which will be described later with reference to FIG. 4, is set by a PSC reserve condition, that is, when the content prefetched to the instruction buffer 23 is changed in the MS 4 by the store operation. Accordingly, when the ACTIVE 29 is ON, the instruction buffer has a vacant area, the instruction is not being fetched and the PSC reserve condition is not present, the AND gate 226 opens to gate the IF request 7. The IF controller 22 further includes an OR gate 224 and an AND gate 225. The OR gate 224 produces a signal 30 in response to the start IU 5, the start IF 27 or the PSC start IU 28, and the AND gate 225 produces a signal 32 when both of the start IU 5 and the start IF 27 are OFF.

Referring again to FIG. 2, when the start IU 5 is ON, the signal 30 is also ON and AND gates 31a and 33a (and also 41a as will be explained later) open so that the start address 13 is read into an instruction fetch address register (IF) 33. When the start address 13 is loaded into the IF 33, the IF controller 22 issues the IF request on line 7 as shown in FIG. 3 and sends the IF request 7 and the IF address 8 (output line of the IF 33) to the SCU 3. When the SCU 3 fetches the instruction from the MS 4, the instruction data 9 is read into the instruction buffer 23. The instruction chain in the instruction buffer 23 is sequentially read out to the instruction register 34 and decoded by the decoder 35. As a result, an instruction length code (ILC), a CS address and an instruction ready signal (IRDY) are queued in an instruction queue register 36. The instruction queue register 36 queues therein the decoded instructions and the associated information if the EU 2 has not completed the instruction execution when the instructions were decoded. As soon as the EU 2 completes the execution of the current instruction, the instruction queue register 36 sends the IRDY 10 and the CS address 11 to the EU 2 to start the execution of the next instruction. On the other hand, the operand address is determined by reading out an index and a base address from a general register 37 specified by the instruction register 34 and summing the index and the base address and a displacement specified by the instruction register 34 in an address adder (AA) 38. The resulting sum is queued in an address queue register 40 through an address adder latch (AAL) 39. The address queue register 40 queues therein the operand address if the EU 2 has not completed the execution of the current instruction when the address addition has terminated. As soon as the EU 2 completes the execution of the current instruction, the address queue register 40 sends the operand address 12 to the EU 2.

An instruction counter (IC) 41 retains the start address of the next instruction to the currently executed instruction. It is used to determine the instruction address when an interrupt request is issued or the PSC compare equal condition is met. The initialization of the IC 41 when the start IU 5 is ON is carried out in the same manner as for the IF 33. That is, the IF controller 22 turns ON the signal 30 to open the AND gate 41a so that the start address 13 is loaded into the IC 41. A path 43 is an output line of the IC 41 and is connected to an input of an IC address incrementer (ICAI) 44. When the execution of the instruction is to be started, the ICAI 50 adds the instruction length ILC from the instruction queue register 26 to the content of the IC 41 to determine the start address of the next instruction. The instruction length ILC is determined by decoding and is applied on ILC 45 from the instruction queue register 36. The resulting sum is supplied to the IC 41 through an ICAI latch (ICAIL) 46 when the signal 30 is OFF to open an AND gate 41b. The IC 41 is updated at every start of the instruction execution.

In order to increment the address by the fetched instruction data length (8 bytes) after the instruction fetch request by the first start address, the IF 33 sends the IF address 8 to an IF address incrementer (IFAI) 47 of the IF 33 to increment the address by eight bytes and sends the incremented address to the IF 33 through an IFAI latch (IFAIL) 48 when the signal 30 is OFF to open an AND gate 33b. The updated content of the IF 33 is used as the instruction fetch address to fetch the next instruction data to the instruction buffer 23 when the eight-byte vacant area is available in the instruction buffer 23. As the instruction execution proceeds, the instructions are sequentially read out from the instruction buffer 23 and the eight-byte vacant area is produced in the instruction buffer 23. Thus, for each vacant area, the IF 33 is updated to fetch the instruction.

When a branch instruction is decoded, a branch-to address is calculated by the AA 38. In case of branch, the branch-to address is sent to an AND gate 31b through the AAL 39. The AND gate 31b opens when the start IF 27 is turned ON by the decoding of the branch instruction, and the IF controller 22 turns ON the signal 30 when the start IF 27 turns ON to open the AND gates 33a and 41a to gate the output of the AAL 39 to the IF 33 and the IC 41 to set the branch-to address. The branch-to address is read out by the IF controller 22 in response to the IF request 7 and the IF address 8. When the branch-to instruction is read out and decoded and the EU 2 starts execution, the IC 41 is incremented by the instruction length.

The PSC controller 25 carries out the PSC check based on the instruction fetch address of the IF 33, the execution instruction address of the IC 41, the ILC, the store address from the EU 2 and the SLC. When the PSC compare equal is detected, that is, when the execution proceeds to the instruction changed by the store operation, the PSC reset IU 26 from the PSC controller 25 is turned ON to reset the IF controller 22. As explained in FIG. 3, the instruction buffer 23 is invalidated by the PSC reset IU 26. When the resetting terminates, the IF 33 and the IC 41 are initialized through the path 49. The instruction address at which the PSC compare equal occured is set on the path 49. This address is supplied though the path 43 of the IC 41. Accordingly, when the PSC compare equal occurs, the next instruction address to the store instruction is always set on the path 49. Thus, when the PSC start IU 28 from the PCS controller 25 is turned ON, the IF controller 22 turns ON the signals on the paths 30 and 32 to open the AND gate 31c, 33a and 41a to transfer the content on the path 49 to the IF 33 and the IC 41. The IF controller 22 turns ON the IF request 7 and starts the instruction fetch by the IF address 8.

FIG. 4 shows the details of the PSC controller 25. In FIG. 4, a store mask generator 50 generates signals G, H, I and J which indicate a two-byte block position in the eight-byte block of the byte to be changed by the store operation, by referring to the three low order bits (bits 29-31) of the store address 18 and the SLC 21. FIGS. 5(a) and 5(b) show the definition of the SLC and the logic of the store mask generator 50.

Referring to FIG. 5(a), the SLC comprises two bits which are significant when the store operation is carried out. When those bits are "00", it indicates that the store operation changes the eight bytes starting from the byte position specified by the store address on the MS 4, and when the bits are "01", "10" and "11", it indicates that two bytes, four bytes and one byte, respectively, are changed. FIG. 5(b) shows the relation between the inputs and the outputs (left table) and the related "1" states of the store masks G-J (right table). In the left table of FIG. 5(b), the inputs are the three low order bits (bits 29-31) of the store address and the bits 0 and 1 of the SLC, and the outputs are the four store mask bits G, H, I, J. A symbol X indicates that it need not be considered as a condition, and the uppermost row of the table indicates that when the SLC bits 0 and 1 are "00", the store masks G–J are all "1" (ON) independently of th store address bits 29–31. In the right table, the rectangular area shows the operand positions in the MS 4 which are changed by the store operation. In an eight-byte block, the G-bit is turned ON when the byte 0 or 1 is stored, the H-bit is turned ON when the byte 2 or 3 is stored, the I-bit is turned ON when the byte 4 or 5 is stored, and the J-bit is turned ON when the byte 6 or 7 is stored. When eight bytes are to be stored, all of the bytes are changed and hence all of the bits G–J are changed to "1". As another example, looking at the sixth row from the top, the store address bits 29–31 are "001" and the SLC bits 0 and 1 are "010" as seen from the right table, indicating that the four-byte operand starting from the byte 1 is changed. Accordingly, the three store mask bits G, H and I are turned ON. The other rows can be interpreted in the same manner. In the present example, however, the operand which extends across two eight-byte blocks cannot be changed at one time but only the bytes within the eight-byte block can be changed. Thus, if the store address bits 29–31 indicate the byte address in the rear area of the eight-byte block (e.g. byte 5, 6 or 7), that portion of the operand length specified by the SLC bits 0 and 1 which extends beyond the eight-byte block boundary is eliminated.

Figure 6:
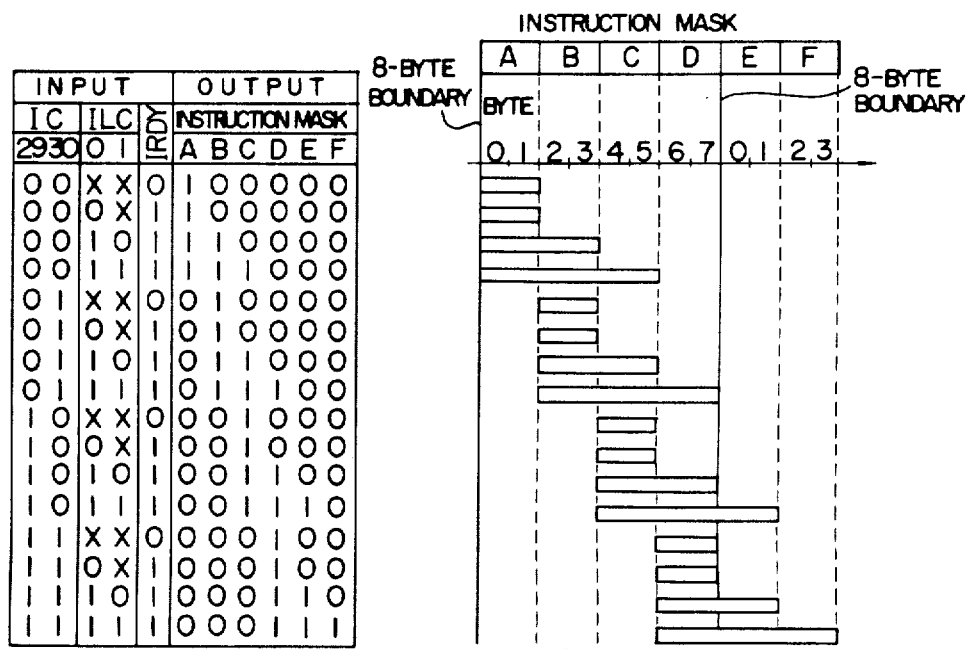
FIGS. 6(a) and (b) illustrate an operation of an instruction mask generator shown in FIG. 4.

Referring to FIG. 4, an instruction mask generator 51 generates signals A, B, C and D, each of which indicate a two-byte block position in the eight-byte block of the instruction to be executed next by referring to the bits 29 and 30 of the IC 41 supplied from the path 43, the ILC 45 and the IRDY 10, and also generates signals E and F which indicate, when the instruction to be executed next extends across the eight-byte block boundary, the two-byte block position in the next eight-byte block of the rear portion of the instruction. FIGS. 6(a) and 6(b) show the definition of the ILC and the logic of the instruction mask generator 51.

Referring to FIG. 6(a), the ILC comprises two bits and it is significant when the IRDY 10 is ON. When those bits are "01", it indicates that the instruction length of the instruction to be executed is two bytes, and when the bits are "10" and "11", it indicates four bytes and six bytes, respectively. The bits "00" are invalid. FIG. 6(b) shows the relation between the inputs and the outputs of the instruction mask generator 51 (left table) and the related "1" states of the instruction masks A–F (right table). In the left table of FIG. 6(b), the inputs are the bits 29 and 30 of the IC and the bits 0 and 1 of the ILC and the IRDY, and the outputs are the six instruction mask bits A, B, C, D, E, F. A symbol X indicates that it need not be considered as a condition. For example, the uppermost row shows that when the IC bits 29 and 30 are "00" and the IRDY is "0" (OFF), the instruction mask bit A is changed to "1" and all other instruction mask bits are changed to "0" independently of the ILC bits 0 and 1. This is due to the assumption of two-byte instruction length because the ILC bits 0 and 1 are usually assured when the IRDY is "0". The right table in FIG. 6(b) shows the "1" states of the bits A–F and the rectangular area indicates the byte position on the MS 4 occupied by the instruction to be executed next. In an eight-byte block, the A-bit is turned ON when the bytes 0 and 1 are occupied by the instruction, the B-bit is turned ON when the bytes 2 and 3 are occupied, the C-bit is turned ON when the bytes 4 and 5 are occupied, and the D-bit is turned ON when the bytes 6 and 7 are occupied. The E-bit and F-bit indicate the byte position in the MS 4 which is occupied by the rear portion of the instruction in the next eight-byte block when the instruction extends across the eight-byte block boundary. The E-bit is turned ON when the rear portion of the instruction occupies the bytes 0 and 1 in the next eight-byte block, and the F-bit is turned ON when it occupies the bytes 2 and 3. By way of another example, looking at the second row from the bottom, the IC bits 29 and 30 are "11", the ILC bits 0 and 1 are "10" and the IRDY is "1". As seen from the right table, it indicates that the front portion of the instruction to be executed next occupies the bytes 6 and 7 and the rear portion of the instruction occupies the bytes 0 and 1 in the next eight-byte block. Thus, the two instruction masks D and E are turned ON. The other rows can be interpreted in the same way.

Referring again to FIG. 4, the store address 18 is supplied to a PSC destination address register (PDAR) 52 and the store mask bits G–J from the store mask generator 50 are supplied to a register 53 and stored therein by an ON output of a PDAR valid trigger (PDARVT) which is turned ON only for one cycle period by the PSC reserve condition to be described later. The PDAR 52 thus temporarily retains the store address 18 at which the PSC reserve condition is met. The register 53 temporarily retains the store mask bits G, H, I, J by which the PSC reserve condition is met, and produces outputs PG, PH, PI and PJ. The PSC reserve condition is met when the store instruction changes an instruction in the memory which instruction has already been fetched to the instruction buffer and the changed instruction is not the next instruction to the store instruction. In this case, the address of the changed instruction (which is equal to the store address at which the PSC reserve condition is met) and the store mask are retained in the PDAR 52 and the register 53.

The IF address and an output path 59 of the PDAR 52 are connected to a selector (SEL) 56, which selects one of those signals in accordance with the state of a control flip-flop (PDARV) 71 to be described later. When the PDARV 71 is in a reset state, that is, when the PSC reserve condition is absent, it selects the IF address 8, and when the PDARV 71 is in a set state, that is, when the PSC reserve condition is present, it selects the output path 59 of the PDAR 52.

The PSC reserve condition is detected by a changed prefetch instruction detecting logic (CPID) 55, to which the output path 43 of the IC 41, the store address 18 and the output path 57 of the SEL 56 are connected. At every store operation, the CPID 55 checks to see if the store address 18 is between the address on the path 43 specified by the IC 41 and the address on the path 57 specified by the SEL 56, that is, if IC path 43 < store address 18 < path 57 and if the above is met, it turns ON the output line 58. Since the SEL 56 selects the signal as described above, the CPID 55 checks the following relation when the PSC reserve condition is absent.

IC path 43 < store address 18 < IF address 8 Thus, it checks if the store operation has been carried out between the address of the instruction to be executed next (on the IC path 43) and the address of the instruction to be fetched next to the instruction buffer (on the IF address 8), that is, if the instruction prefetched to the instruction buffer 23 has been changed of the MS 4. On the other hand, when the PSC reserve condition is present, the CPID 55 checks to see if IC path 43<store address 18<PDAR 52 is met to check if the store operation has been carried out between the address of the instruction to be executed next (on the IC path 43) and the address of the instruction already changed (PDAR 52), that is, if that instruction of the prefetched instructions which is to be executed earlier than the instruction changed by the store operation which caused the PSC reserve condition, has been changed on the MS 4. As described above, since the PDAR 52 and the register 57 read in the input signals when the PDARVT 69 is set by the PSC reserve condition, they retain the address and the store mask of that one of the changed instructions which is to be executed first, when a plurality of store instructions sequentially generate the PSC reserve conditions.

Figure 7:
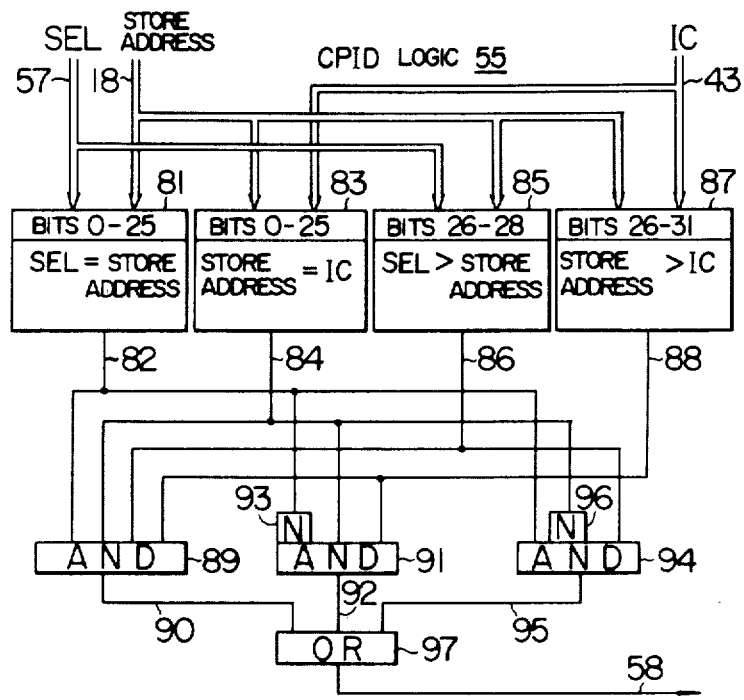
FIG. 7 shows a block diagram of a changed prefetch instruction detecting logic.
Figure 8:
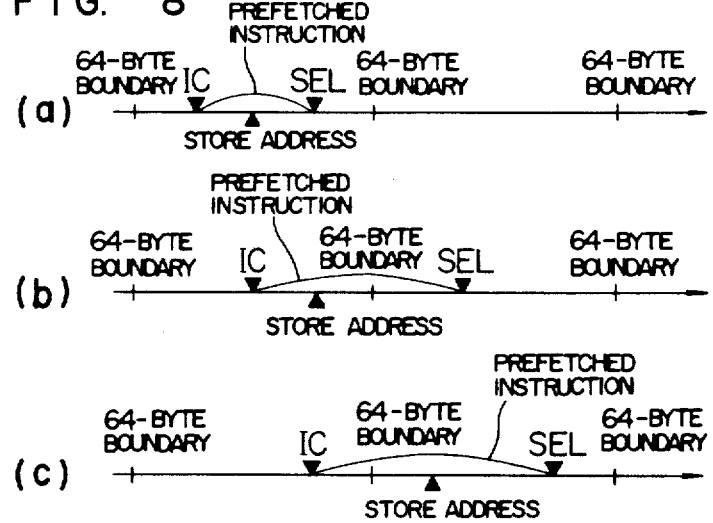
FIG. 8 illustrates an operation of FIG. 7.

FIG. 7 shows the details of the CPID 55. A compare equal detection circuit 81 turns ON an output line 82 when the corresponding bits 0-25 of the SEL output path 57 and the store address 18 are all equal. Thus, when the output line 82 is ON, it indicates that the SEL output path 57 and the store address 18 are equal for the 64-byte block, that is, both addresses are in the same 64-byte block. The 64-byte block in the present embodiment comes from the 64-byte capacity of the instruction buffer 23. Another compare equal detection circuit 83 turns ON an output line 84 when the corresponding bits 0-25 of the store address 18 and the IC path 43 are all equal. Accordingly, when the output line 84 is ON, it indicates that the store address 18 and the IC path 43 are equal for the 64-byte block, that is, both addresses are in the same 64-byte block. A compare circuit 85 compares the bits 26-28 of the SEL output path 57 and the store address 18, and when the SEL output path 57 is larger than the store address 18, it turns ON an output line 86. Accordingly, when the output line 86 is ON, it indicates that the SEL output path 57 is larger than the store address 18 when compared by an eight-byte block in the 64-byte block. Another compare circuit 87 compares the bits 26-31 of the store address 18 and the IC path 43, and when the store address 18 is larger than the IC path 43, it turns ON an output line 88. Accordingly, when the output line 88 is ON, it indicates that the store address 18 is larger than the IC path 43 when compared by a one-byte block in the 64-byte block. An AND gate 89 turns ON an output line 90 when all of the output lines 82, 84, 86 and 88 are ON. FIG. 8(a) illustrates the function of the AND gate 89. The ON states of both output lines 82 and 84 indicate that the addresses of the IC path 43, the store address 18 and the SEL output path 57 are in the same 64-byte block, and the ON states of both output lines 86 and 87 indicate that the store address 18 is present between the address of the IC path 43 and the address of the SEL output path 57 in the 64-byte block. In the present embodiment, the distance between the IC path 43 and the SEL output path 57 does not exceed 64 bytes because the number of bytes of the instruction prefetched by the IU 1 does not exceed 64. It indicates that the instruction prefetched to the instruction buffer 23 by the UI 1 has been changed in the MS 4. An AND gate 91 turns ON an output line 92 when output line 82 is OFF and the output lines 84 and 88 are ON. A NOT gate 93 is an ON/OFF inverter circuit which produces an OFF output when the output line 82 is ON and produces an ON output when the output line 82 is OFF. FIG. 8(b) illustrates the function of the AND gate 91. The OFF state of the output line 82 and the ON state of the output line 84 indicate that the addresses of the store address 18 and the SEL output path 57 are in different 64-byte blocks and the addresses of the IC path 43 and the store address 18 are in the same 64-byte block. The ON state of the output line 88 indicates that the store address 18 is larger than the IC path 43 in the 64-byte block in which the IC path 43 and the store address 18 are present. Since the address of the SEL output path 57 is equal to or in advance of the address of the IC path 43, the comparison of the store address 18 and the SEL output path 57 is not necessary in the case of FIG. 8(b). FIG. 8(b) also shows that the instruction prefetched by the IU 1 has been changed by the store operation. Another AND gate 94 turns ON an output line 95 when the output line 82 is ON, the output line 84 is off and the output line 86 is ON. A NOT gate 96 is an ON/OFF inverter circuit for the output line 84. FIG. 8(c) illustrates that the IC path 43 and the store address 18 are in different 64-byte blocks and the store address 18 and the SEL output path 57 are in the same 64-byte block. When the output line 86 is ON, it indicates that the SEL output path 57 is larger than the store address 18 in the 64-byte block in which the store address 18 and the SEL output path 57 are present. Since the address of the SEL output path 57 is equal to or in advance of the address of the IC path 43, the comparison of the store address 18 and the IC path 43 is not necessary in the case of FIG. 8(c). FIG. 8(c) also shows that the instruction prefetched by the IU 1 has been changed by the store operation. The output lines 90, 92, 95 of the AND gates 89, 91, 94 are OR'ed by an OR gate 97 which turns on an output line 58 when one of the inputs thereto is ON.

Referring again to FIG. 4, a changed next instruction detecting logic (CNID) 60 detects the changing of the next instruction by the store instruction to turn ON an output line 61. The inputs to the CNID 60 are the store address 18, the output line 53 of the store mask generator 50, the IC path 43 and the output line 63 of the instruction mask generator 51. As described above, the store masks G-J from the store mask generator 50 indicate a two-byte block address in the eight-byte block which includes the byte to be changed by the store operation, and the store address 18 specifies the eight-byte operand on the MS 4 which is to be changed by the store operation. On the other hand, the instruction masks A-D from the instruction mask generator 51 indicate a two-byte block position, in the eight-byte block specified by the IC path 43, in which two-byte block the instruction to be executed next is located. The instruction masks E and F indicate two-byte block in the next eight-byte block in which the rear portion of the instruction is located, when the instruction to be executed next extends across the eight-byte block boundary.

When the store address 18 and the address on the IC path 43 are equal when compared by the eight-byte block, the store masks G-J and the instruction masks A-D are collated. When the result of the collation (A·G+B·H+C·I+D·J) is ON, it indicates that the instruction to be executed next has been changed by the store operation so that the output line 61 is turned ON. When the instruction to be executed extends across the eight-byte block boundary, the store address 18 is compared with the address of the IC path 43 incremented by eight bytes, that is, the address of the next eight-byte block boundary, and if they are equal, the store masks G-H and the instruction masks E-F are collated (E·G+F·H). If the result of the collation is ON, it indicates that the rear portion of the instruction to be executed next has been changed by the store operation so that the output line 61 is turned ON. By the provision of the CNID 60, the updating of the immediately following instruction by the store operation can be detected without delay.

Figure 9:
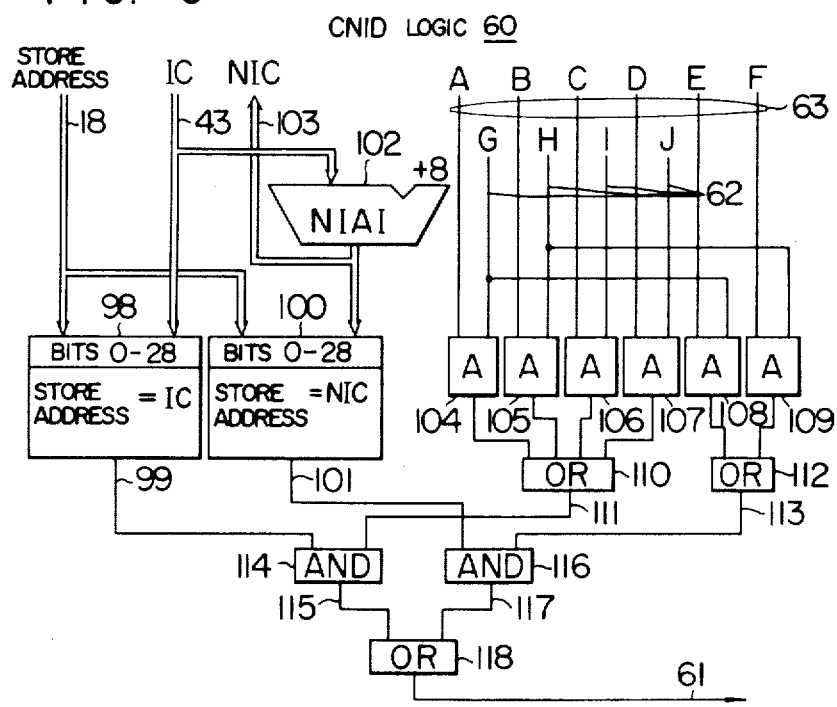
FIG. 9 shows a block diagram of a changed next instruction detecting logic.
Figure 10:
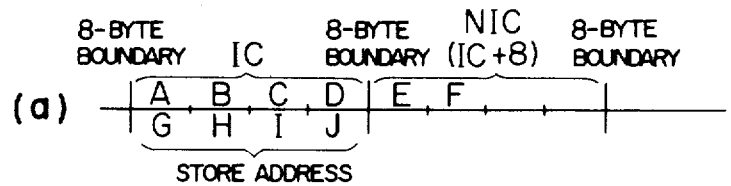
FIG. 10 illustrates an operation of FIG. 9.

FIG. 9 shows a detail of the CNID 60. In FIG. 9, a compare circuit 98 turns ON an output line 99 when the corresponding bits 0-28 of the store address 18 and the IC path 43 are equal. Thus, when the output line 99 is ON, it indicates that the store address 18 and the IC path 43 are equal for the eight-byte block (that is, both addresses are in the same eight-byte block). Another compare circuit 100 turns ON an output line 101 when the corresponding bits 0-28 of the store address 18 and a NIC 103 are equal. The NIC 103 is the address of the IC path 43 incremented by eight bytes by a next instruction address incrementer (NIAI) 102, and it specifies the next eight-byte block address to the eight-byte block in which the address of the IC path 43 is present. Thus, when the output line 101 is ON, it indicates that the store address 18 is present in the next eight-byte block to the eight-byte block specified by the IC path 43. AND gates 104-109 turn on their output lines when AND conditions of A and G, B and H, C and I, D and J, E and G and F and H are met, respectively. The output lines of the AND gates 104-107 are connected to inputs of an OR gate 110 which turns ON an output line 111 thereof when one of the inputs thereto is ON. The output lines of the AND gates 108 and 109 are connected to inputs of an OR gate 112, which turns ON an output line 113 thereof when one of the inputs thereto is ON. An AND gate 114 turns ON an output line 115 when both the output lines 99 and 111 are ON, and an AND gate 116 turns ON an output line 117 when both the output lines 101 and 113 are ON. FIG. 10(a) illustrates the function of the AND gate 114. When the output line 99 is ON, it indicates that the addresses of the store address 18 and the IC path 43 are in the same eight-byte block, and when the output line 111 is ON, it indicates that the AND conditions of the corresponding bits of the instruction masks A, B, C, D and the store masks G, H, I, J are met, that is, the instruction and the stored operand overlap each other in the MS 4.

FIG. 10(b) illustrates the function of the AND gate 116. When the output line 101 is ON, it indicates that the store address 18 is located in the next eight-byte block to the eight-byte block specified by the address of the IC path 43, and when the output line 113 is ON, it indicates that the AND condition of the rear portion of the instruction which extends across the eight-byte boundary (one or both of the instruction masks E and F are ON) and the corresponding bits of the store masks G and H is met, that is, the rear portion of the instruction and the stored operand overlap each other in the MS 4. Accordingly, when one of the output line 115 of the AND gate 114 and the output line 117 of the AND gate 116 is ON, an output line 61 of an OR gate 118 is turned ON to indicate that the store instruction has changed the instruction to be executed next.

Referring again to FIG. 4, an IC-PDAR coincidence detecting logic (IPCD) 64 carries out the PSC check after the PSC reserve condition has been met. The input lines 59 and 65 to the IPCD 64 supply the address of the changed portion of the changed instruction to be first executed, and the store masks. The other input lines 43 and 63 supply the address of the instruction to be executed next and the instruction masks. Accordingly, by comparing the input lines 59 and 43 and collating the store masks PG-PJ and the instruction masks A-F, it is checked if the reserved PSC condition is actually met, and if it is met an output line 66 is turned ON.

Figure 11:
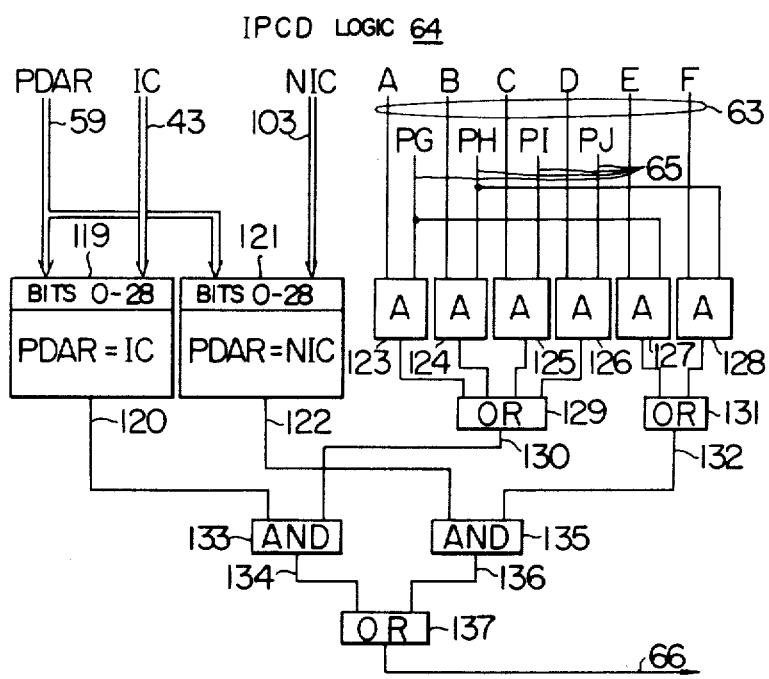
FIG. 11 shows a block diagram of an IC-PDAR coincidence detection logic shown in FIG. 4.
Figure 12:
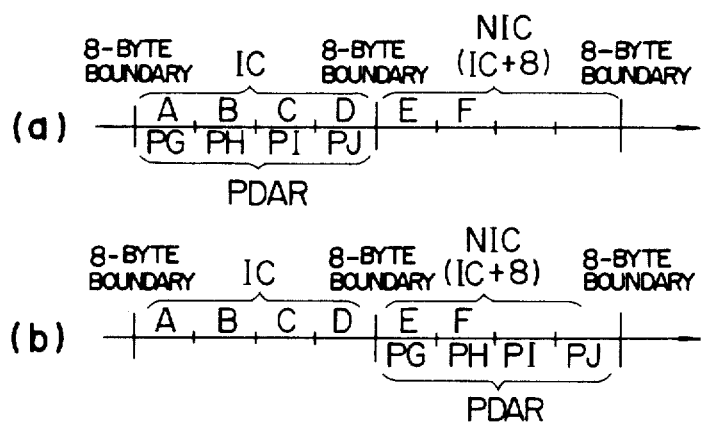
FIG. 12 illustrates an operation of FIG. 11.

FIG. 11 shows the details of the IPCD 64. A compare circuit 119 turns ON an output line 120 when the corresponding bits 0-28 of the PDAR output path 59 and the IC path 43 are equal. Accordingly, when the output line 120 is ON, it indicates that the addresses of the PDAR output path 59 and the IC path 43 are equal for the eight-byte block (that is, both addresses are in the same eight-byte boundary). Another compare circuit 121 turns ON an output line 122 when the corresponding bits 0-28 of the PDAR output path 59 and the NIC 103 are equal. The NIC 103 bears the address of the IC 43 incremented by eight bytes by the NIAI 102 and it specifies the next eight-byte block address to the eight-byte block specified by the address of the IC path 43. Accordingly, when the output line 122 is ON, it indicates that the address on the PDAR output line 59 is located in the next eight-byte block to the eight-byte block specified by the IC path 43. AND gates 123-128 turn ON output lines thereof when AND conditions of A and PG, B and PH, C and PI, D and PJ, E and PG and F and PH are met, respectively. The output lines of the AND gates 123-126 are connected to inputs of an OR gate 129 which turns ON an output line 130 thereof when one of the inputs thereto is ON. The output lines of the AND gates 127 and 128 are connected to inputs of an OR gate 131 which turns ON an output line 132 thereof when one of the inputs thereto is ON. An AND gate 133 turns ON an output line 134 thereof when both the output lines 120 and 130 are ON, and an AND gate 135 turns ON an output line 136 thereof when both the output lines 122 and 132 are ON. FIG. 12(a) illustrates the function of the AND gate 133. When the output line 120 is ON, it indicates that the PDAR output path 59 and the IC path 59 are in the same eight-byte block, and when the output line 130 is ON, it indicates that the AND conditions of the instruction masks A, B, C, D and the corresponding bits of the PDAR store masks PG, PH, PI, PJ are met, that is, the instruction and the operand stored by the store instruction which caused the PSC reserve condition overlap each other on the MS 4.

FIG. 12(b) illustrates the function of the AND gate 135. When the output line 122 is ON, it indicates that the address of the PDAR output path 59 is located in the next eight-byte block to the eight-byte block specified by the IC path 43, and when the output line 132 is ON, it indicates that the AND conditions of the rear portion of the instruction which extends across the eight-byte block boundary (one or both of the instruction masks E and F are ON) and the corresponding bits of the PDAR store masks PG and PH are met, that is, the rear portion of the instruction and the operand stored by the store operation which caused the PSC reserve condition overlap each other in the MS 4. Thus, an OR gate 137 turns ON an output line 66 thereof when one of the output lines 134 of the AND gate 133 or the output line 136 of the AND gate 135 is ON to indicate that the store instruction which caused the PSC reserve condition has changed the instruction to be executed next.

Figure 13:
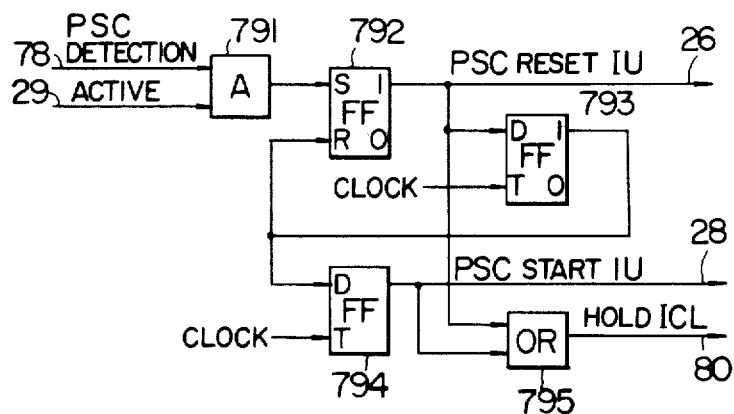
FIG. 13 shows a block diagram of a PSC condition controller shown in FIG. 4.

Referring to FIG. 4, an AND gate 67 detects the PSC reserve condition. When the store request 17 is ON, the output line 58 of the CPID 55 is ON and the output line 61 of the CNID 60 is OFF (the store instruction has not changed the instruction to be executed next), the AND gate 67 turns ON an output line 68 to set a PDAR valid trigger (PDARVT) 69, which is a phase controlling flip-flop and is turned ON when the output line 68 of the AND gate 67 is ON and turned OFF when the output line 68 is OFF. Thus, the PDARVT 69 is turned ON for only one cycle period each time when the PSC reserve condition is met. An output line 70 of the PDARVT 69 sets a PDAR valid flip-flop (PDARV) 71 and also is connected to the PDAR 52 and the register 53 to latch the store address 18 which caused the PSC reserve condition and the store masks G–J in the PDAR 52 and the register 53. Accordingly, the PDAR 52 and the register 53 always retain the address and the store masks of the changed instruction which is to be executed first. The PDARV 71 is a status flip-flop for retaining the PSC reserve condition, and it is set when the output line 70 of the PDARVT 69 is turned ON when the ACTIVE 29 indicating the validity of the IF controller 22 is turned ON, and reset when the ACTIVE 29 is turned OFF. An output line 42 of the PDARV 71 is connected to the IF controller 22 and the SEL 56. As explained in FIG. 3, the IF controller 22 prevents the issuance of the IF request and suppresses the instruction prefetch from the MS 4 to the instruction buffer 23. The SEL 56 selects the input to the CPIP 55. When the output line 42 of the PDARV 71 is OFF, the SEL 56 selects the IF address 8 onto the line 57, and when it is ON, the SEL 56 selects the address line PDAR 59. The output line 42 of the PDARV 71 is further connected to an AND gate 73. Accordingly, the output line 66 of the IPCD 64 can turn ON an output line 74 of the AND gate 73 only when the PDARV 71 which indicates the validity (PSC reserve condition) of the PDAR 52 and the store mask register 53 is ON. An AND gate 75 AND's the output line 61 of the CNID 60 and the store request 17. Thus, the output line 61 of the CNID 60 can turn ON the output line 76 of the AND gate 75 only when the store request 17 is ON. The output line 76 of the AND gate 75 and the output line 74 of the AND gate 73 are inputs to an OR gate 77 which turns ON an output line 78 thereof when one of the inputs thereto is ON to indicate the occurrence of the PSC. Thus, the output line 78 of the OR gate 77 is turned ON when the store request is issued (the store request 17 is ON) and the store operation changes the next instruction to the store instruction (the output line 61 of the CNID 60 is ON), or when the PSC reserve condition is met (PDARV 71 is ON) and the changed instruction is to be executed next (the output line 66 of the IPCD 64 is ON). In any of those cases, the PSC must be issued. When the output line 78 of the OR gate 77 is turned ON, it starts a PSC condition controller 79 to start the PSC process. FIG. 13 shows the details of the PSC condition controller 79.

Referring to FIG. 13, an AND gate 791 opens when a PSC detection signal 78 is ON and the ACTIVE 29 is ON to set a flip-flop 792, which in turn turns ON the PSC reset IU 26, which is supplied to the IF controller 22 (FIGS. 2 and 3) to invalidate the instruction buffer 23. The PSC reset IU 26 is supplied to a D-terminal of the D-type triggerable flip-flop 793 which is a phase controlling flip-flop. It reads in the status at the D-terminal when a clock is applied to a T-terminal. Accordingly, the flip-flop 793 is set when the PSC reset IU 26 is turned ON to reset the flip-flop 792 and set a flip-flop 794 of the same type as the flip-flop 793. The flip-flop 794 thus turns on the PSC start IU 28 which is supplied to the IF controller 22. An OR gate 795 OR's the PSC reset IU 26 and the PSC start IU 28 to turn ON a hold ICL 80.

Referring to FIG. 4, the hold ICL 80 is supplied to the ICL 54. The hold ICL 80 is an input inhibit signal to the ICL 54 to instruct to the ICL 54 to hold the content of the IC path 43 read in the ICL 54. Thus, the ICL 54 holds the address of the instruction which caused the PSC condition (that is, the instruction changed by the store operation). When the PSC start IU 28 is ON, it is used as the initial address to the IF 33 and the IC 41 through the AND gate 31c (FIG. 2).

We claim:

1. In a data processing system in which instructions are prefetched from a main storage to an instruction buffer in advance of the execution of an instruction in response to an instruction fetch address and the instructions are read out from said instruction buffer for execution, the improvement comprising:

prefetch means for specifying an instruction fetch address of an instruction to be fetched from said main storage to said instruction buffer;

means for specifying an execution instruction address of an instruction to be executed and first information indicating the byte position at which said instruction is stored in said main storage;

means for specifying a store address by a store instruction and second information indicating the byte position of the content in the main storage which is changed by a store operation;

detection means for detecting that the content of the instruction fetched from said main storage to said instruction buffer has been changed in said main storage as a result of said store operation and that the execution of the instructions has proceeded to the instructions changed in said main storage, based on said fetch address, said execution instruction address, said first information, and store address and said second information;

suppression means for suppressing operation of said prefetch means in response to the detection by said detection means that the content of the instruction fetched from said main storage to said instruction buffer has changed in said main storage as a result of said store operation; and invalidating means for invalidating the content of said instruction buffer in response to the detection by said detection means that the execution of the instruction has proceeded to the instruction changed in said main storage.

2. A data processing system according to claim 1 wherein said detection means includes holding means for holding said store address and said second information, first detection means for detecting that the content of the instruction fetched from said main storage to said instruction buffer has been changed in said main storage as a result of said store operation and second detection means for detecting that the execution of the instructions has proceeded to the changed instruction, and further including means for enabling said holding means to hold the store address by the store instruction and said second information each time said first detection means detects the changing of an instruction in said main storage, and said second detection means including means for detecting that said changed instruction is next to be executed based on said execution instruction address, said first information and the store address and the second information held in said holding means.

3. A data processing system according to claim 2 wherein said suppression means responds to the detection by said first detection means.

4. A data processing system according to claim 1 or 3 wherein said invalidating means responds to the detection by said second detection means.

5. A data processing means according to claim 2 wherein said detection means further includes third detection means for detecting that the next instruction to said store instruction has been changed in said main storage as a result of said store operation, based on said store address by said store instruction, said second information, said execution instruction address and said first instruction, said invalidating means responding to the detections by said second detection means and said third detection means.

6. A data processing system according to claim 2 or 5 further comprising bistable means which is set in response to the detection by said first detection means and reset in response to the invalidation of said instruction buffer, an output of said bistable means suppressing the instruction prefetch from said main storage to said instruction buffer.

7. A data processing system according to claim 6 further comprising selection means for selectively supplying either said instruction fetch address or the store address held in said holding means to said first detecting means, said selection means selecting said instruction fetch address when said bistable means is in a reset state and selecting the store address held in said holding means when said bistable means is in a set state.

8. A data processing system according to claim 6 wherein said second detection means is enabled when said bistable means is in the set state.

9. A data processing system according to claim 2, wherein said first detection means includes means for detecting the changing of an instruction in said main storage based on said instruction fetch address, said store address by the store instruction and said execution instruction address.

10. A data processing system according to claim 9, wherein said instruction buffer has the capacity to hold a plurality of instructions, and further including means responsive to the instruction fetch address generated by said prefetch means for fetching a plurality of instructions from said main memory to said instruction buffer.

11. A data processing system according to claim 9 or 10, wherein said first detection means further includes means responsive to detection of a change in an instruction in said main storage for detecting a further change in the instruction as a result of a further store operation on the basis of said instruction fetch address, said store address by the store instruction causing said further store operation and the store address held in said holding means.

12. A data processing system according to claim 1, wherein said instruction buffer has the capacity to hold a plurality of instructions, and further including means responsive to the instruction fetch address generated by said prefetch means for fetching a plurality of instructions from said main memory to said instruction buffer.

* * * * *